(12) United States Patent
Wallis et al.

(10) Patent No.: US 6,282,569 B1
(45) Date of Patent: Aug. 28, 2001

(54) NAME SERVER COMPUTER HAVING A LOAD LEVELLING FACILITY TO SPREAD THE LOAD FROM CLIENT COMPUTERS ACROSS A PLURALITY OF SERVER COMPUTERS

(75) Inventors: Graham Derek Wallis, Locks Heath; Michael George Taylor, Southampton; Michael Platt, Hambledon; Andrew James Stanford-Clark, Eastleigh, all of (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 08/868,111

(22) Filed: Jun. 3, 1997

Related U.S. Application Data

(63) Continuation of application No. 08/297,469, filed on Aug. 29, 1994, now abandoned.

(30) Foreign Application Priority Data

Sep. 11, 1993 (GB) .................................................. 9318877

(51) Int. Cl.[7] ....................................................... G06F 12/00
(52) U.S. Cl. ........................... 709/224; 709/203; 709/223; 709/226; 709/205
(58) Field of Search .................................... 709/201, 202, 709/203, 204, 217, 218, 219, 226, 227, 228, 330; 700/178; 710/100; 707/202, 203, 204, 205

(56) References Cited

U.S. PATENT DOCUMENTS

| 4,737,983 | 4/1988 | Frauenthal et al. ................... 379/221 |
| 5,155,851 | * 10/1992 | Krishnan .............................. 395/650 |
| 5,249,290 | * 9/1993 | Heizer .................................. 395/650 |

(List continued on next page.)

FOREIGN PATENT DOCUMENTS

| 0232509 | 8/1987 | (EP) . |
| 0240145 | 10/1987 | (EP) . |

OTHER PUBLICATIONS

Gopal et al, Analysis of a Class of Distributed Directory Algorithms, Infocom '89, pp. 293–302.*
Spahni et al, A Local Name Server for Organizational Message Handling Systems, Digital Communications 1988 Zurich Seminar, pp. 239–246.*
Anklesaria et al, The Internet Gopher Protocol, Network Working Group, Mar. 1993.*

*Primary Examiner*—Majid Banankhah
(74) *Attorney, Agent, or Firm*—Jerry W. Herndon

(57) ABSTRACT

A name server computer and method of operating such a computer, for facilitating a connection of a program on a client computer to a server, the server consisting of a plurality of server computers with shared resources. The name server computer, the client computer, and the server computers all reside in a logical network. The name server computer receives a request from the client computer for a computer address of a server computer identified by a server computer name sent with the request, such computer address enabling a connection to be made from the client computer to that server computer via the network. A list of server computer names with their computer addresses is provided. The name server computer uses the list to convert the server computer name received from the client computer into the computer address of the server computer, and then sends the computer address to the client computer. The computer further includes decision logic for studying the server computers at predetermined intervals having regard to a predetermined test criteria, to select one of the server computers. The list is then updated by associating the computer address for the server computer selected by the decision logic with a particular server computer name contained as a generic server computer name in the list. Using this technique, when a client computer specifies the generic server computer name, it receives the computer address of the server computer identified by the decision logic.

13 Claims, 3 Drawing Sheets

U.S. PATENT DOCUMENTS

| | | | | |
|---|---|---|---|---|
| 5,335,356 | * | 8/1994 | Andersson | 455/54.1 |
| 5,341,477 | * | 8/1994 | Pitkin et al. | 395/200 |
| 5,408,619 | * | 4/1995 | Oran | 395/325 |
| 5,434,914 | * | 7/1995 | Fraser | 379/219 |
| 5,475,819 | * | 12/1995 | Miller et al. | 395/200.03 |
| 5,504,894 | * | 4/1996 | Ferguson et al. | 395/650 |

* cited by examiner

NAME SERVER COMPUTER HAVING A LOAD LEVELLING FACILITY TO SPREAD THE LOAD FROM CLIENT COMPUTERS ACROSS A PLURALITY OF SERVER COMPUTERS

The application is a continuation, of application Ser. No. 08/297,469, filed Aug. 29, 1994, now abandoned.

The present invention relates to a data processing system for facilitating the connection of a program on a client computer to a server, the server consisting of a plurality of server computers with shared resources.

The data processing system, the client computer, and the server computers are all resident on a network. This network need not be one physical network such as a Local Area Network (LAN); for instance it may consist of a number of LANS or WANS (wide area networks) connected together (eg. via 'bridges') to form a single logical network. However the same network protocol will be employed throughout the network, a typical example of such a protocol being TCP/IP which will be familiar to those skilled in the art.

In many environments it is increasingly found that a number of server computers are connected together using some form of network, eg. a LAN. It is often the case that several users of client computers will be connected to one such server computer, whilst other server computers stand idle. An example of this is when such computers are situated in workers' offices, connected by, for example, a token ring LAN using the standard TCP/IP network protocol. When workers are away from their offices, their computers will usually stand idle.

In such situations it is commonly the case that a few of the computers in the network are heavily loaded, whilst other computers in the network are very lightly loaded, giving poor response and performance for the client computers using the heavily loaded server computers. Hence there is a problem of how to enable the client user load to be spread more evenly across the available computing resources of the server in a manner which is transparent to the client computer and its programs. If transparency is to be achieved, standard protocols need to be observed in order that client computers can use a variety of connection methods without modification of any programs being required.

A prior art technique which has been developed to provide some sort of load spreading is called "Static load levelling". With this technique each application on each client computer has a designated server to which it always connects. Hence, for example, if there are 200 potential clients of a server having five server computers, a pre-specified group of, say, 40 of the clients will be told (or configured) to always connect to machine 1, etc. On average it may be argued that this will give a reasonably even load across all of the server computers. However in practice it is often the case that, using this technique, a large number of users of client computers are connected to one server computer, while an adjacent server computer stands completely idle (eg. given the above example there could easily be 40 users on one server computer whilst the other 4 server computers stand idle). Hence in situations where the user loading changes from time to time, the prior art static load levelling technique is not particularly satisfactory. What is required in such instances is a more 'dynamic' technique which can respond to changing user loads, and thus direct new users to the most suitable (eg. least heavily loaded) server computers in the server.

Other prior art techniques can be found in other environments, such as those where job allocation is an issue. For instance in "batch processing", a client computer submits an encapsulated task to a central server, which determines which one of several possible servers is quiet enough to be able to handle the task. The task is sent to that server, is processed, and the results are then sent back to the client (e.g. as a results file, or by electronic mail). With a batch processing system, there is a brief connection to the central server while the job is transferred from the client to the server allocated by the central server. After this brief connection the client disconnects, and has no more interaction with the submitted task until it has been completed, and the results have been passed back to the client by some means.

However in the situation with which we are currently concerned, the dynamic load levelling technique that is required must be able to deal with "interactive" sessions. Rather like a phone conversation, the connection between the program on the client computer and a particular server computer will persist for the duration of the "conversation" session. Hence the batch processing concept is inappropriate in the present situation.

It is possible to write some specific code within a program on a client computer which contains internal message-passing systems to route work from that client program to a corresponding server program. Such systems are dedicated only to that particular client program, and the connection and load-levelling methods are not accessible to other client-server applications. Often, such systems operate by the client connecting to a specific "host" server computer, and from there the work will be sent to another server for processing. Clearly this technique can result in large bottlenecks arising at the "host" server computer.

Hence such a technique is not suitable in the present situation since it only supports one very specific type of client-server connection, whereas we need a technique that will allow any client-server connection method using the network protocol to be connected to a quiet server in a way that is completely transparent to the client program. Further the above technique relies on an initial connection to the 'central' host server computer, which then passes the request on to another server computer; as described above this can potentially create a serious bottleneck.

It is an object of the present invention to provide a technique which facilitates a connection between a client program and a server computer on a server in a way that takes into account the current status of the server computers forming the server. This technique must observe standard network protocols and should operate in a manner which is transparent to the client program requesting access.

Accordingly the present invention provides a data processing system for facilitating a connection of a program on a client computer to a server, the server consisting of a plurality of server computers with shared resources, the data processing system, the client computer, and the server computers residing in a network, the system comprising: input means for receiving a request from the client computer for a machine address of a server computer identified by a server computer name sent with the request, such a machine address enabling a connection to be made from the client computer to that server computer via the network; a storage device for storing a list identifying server computer names with machine addresses of the server computers; conversion means for using the list to convert the server computer name received by the input means into the machine address of the server computer; output means for sending the machine address from the conversion means to the client computer; the system being characterised by: decision logic for studying the server computers at predetermined intervals having regard to predetermined test criteria, in order to select one of the server computers; and writing means for updating the list by associating the machine address for the server computer selected by the decision logic with a particular server computer name contained as a generic server computer name in the list; whereby when a client computer specifies the generic server computer name, it receives the machine address of the server computer identified by the decision logic.

Typically the conversion means will access the list from a local piece of storage, the data processing system having a copier to copy the list from the storage device to that piece of memory. In preferred embodiments the data processing system further comprises a messaging means, responsive to the updating of the list by the writing means, for sending a message to the copier requesting the copier to copy the updated list into the piece of local memory.

Any manner of predetermined test criteria can be used in the data processing system of the invention, for example the amount of idle processor time, the number of processes running, the amount of free memory, the "load average", etc. However in preferred embodiments the predetermined test criteria are such that the decision logic identifies the server computer having the least number of client programs logged on to it.

In preferred embodiments the predetermined intervals are variable and will either be set by a user of the system, eg. the system administrator, or will be adjusted dynamically. The user will also set the predetermined test criteria to be used by the decision logic.

Further in preferred embodiments the user can limit the number of server computers which the decision logic studies. This may be useful if, for instance, some of the server computers have not got access to all of the resources that other server computers have access to, and so would not be suitable as server computers to be associated with the generic server computer name.

In some embodiments it may be advantageous to use a plurality of generic names. Each server name would then have a number of server computers whose machine addresses are associated with that generic name, the decision logic employing different sets of predetermined test criteria for each generic name. In such embodiments one or more of the server computers can be associated with a plurality of the generic names.

Viewed from a second aspect the present invention provides a method of operating a data processing system to facilitate a connection of a program on a client computer to a server, the server consisting of a plurality of server computers with shared resources, the data processing system, the client computer, and the server computers residing in a network, the method comprising the steps of: (a) receiving a request from the client computer for a machine address of a server computer identified by a server computer name sent with the request, such a machine address enabling a connection to be made from the client computer to that server computer via the network; (b) storing a list identifying server computer names with machine addresses of the server computers in a storage device; (c) converting, with reference to the list, the server computer name received at step (a) into the machine address of the server computer; (d) sending the machine address identified at step (c) to the client computer; the method being characterised by the steps of: (e) employing decision logic to study the server computers at predetermined intervals having regard to predetermined test criteria, in order to select one of the server computers; and (f) updating the list by associating the machine address for the server computer selected by the decision logic with a particular server computer name contained as a generic server computer name in the list; whereby when a client computer specifies the generic server computer name at step (a), it receives the machine address of the server computer identified by the decision logic.

The present invention will be described further, by way of example only, with reference to an embodiment thereof as illustrated in the accompanying drawings, in which.

Figure 1:
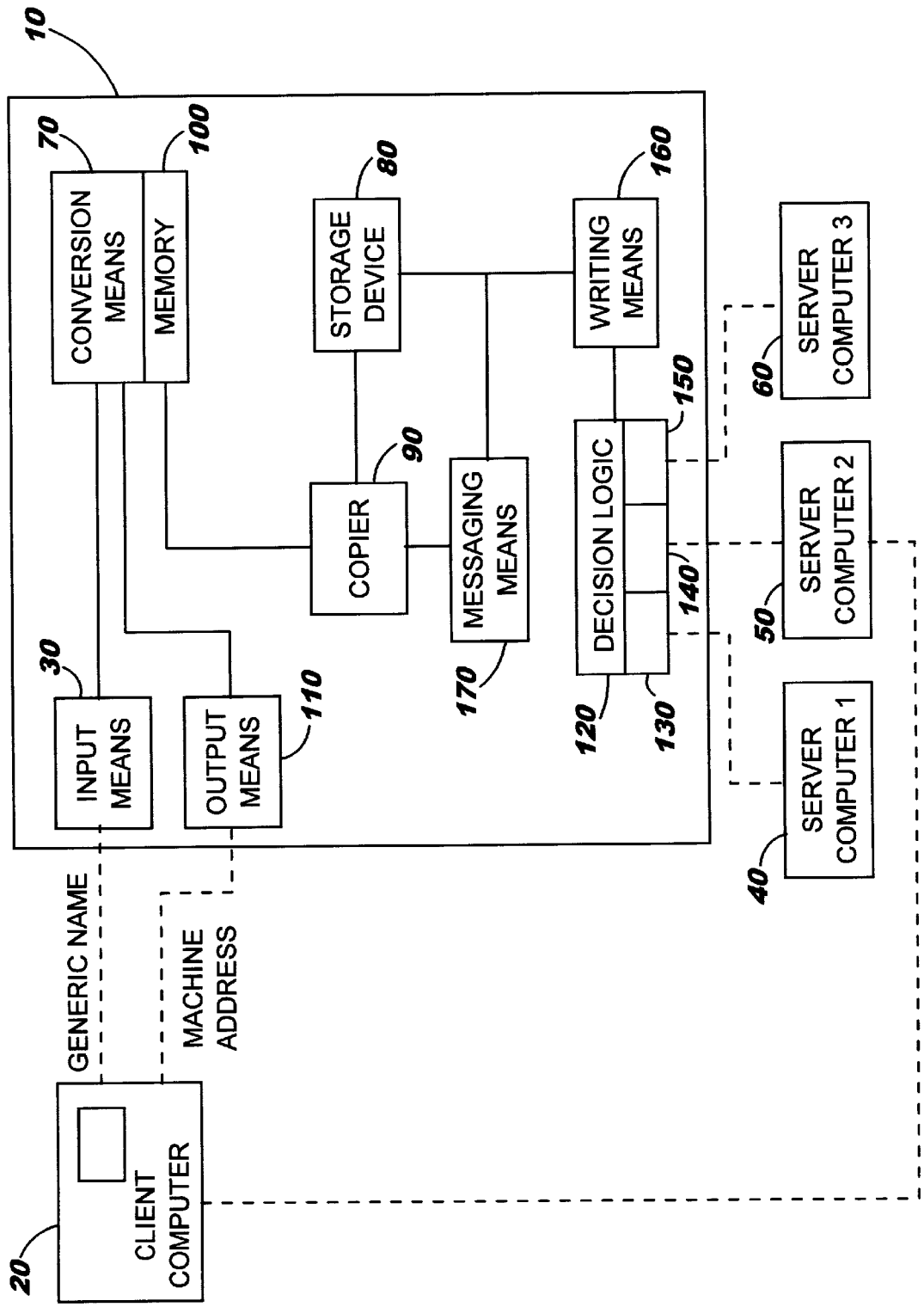
FIG. 1 is a block diagram illustrating the data processing system of the preferred embodiment.

in the preferred embodiment we will consider the situation where the server in question is a high performance database server which has its data distributed across a network of server computers, this server network hereafter being referred to as a cluster. Database applications being run by users on client computers are required to connect to one of the server computers in the cluster to enable them to access the data in the database server. By the nature of the database system, it does not matter which server computer the client connects to—all of the data is accessible from any server computer in the cluster. In the preferred embodiment the server computers and the client computers are all interconnected using TCP/IP on a token ring Local Area Network.

For a large number of users, it is highly desirable to have a number of users on each of the server computers in the server cluster, rather than all users connecting to (and hence overloading) just one or a few of the server computers. With a widely varying user workload profile for the database server, this problem can only be solved by providing some form of "load levelling" process, which will allocate new client application instances to server computers in the cluster that are most suitable for the client connection (eg. because they are more lightly loaded than other server computers). Clearly this process must be dynamic, able to respond to changing load conditions over time. Since the database applications on the client computers are typically complex and often are supplied only in object code form, it would be very difficult (or impossible) for the system administrator to alter them, and so it is essential that this allocation is done in a manner which is entirely transparent to the client application.

The manner in which the data processing system of the preferred embodiment solves the above problems will now be described with reference to FIG. 1.

Each client computer in a network using the TCP/IP protocol (there will typically be many such client computers) will have been informed by the network administrator that it is to communicate with a particular computer when it wishes to convert a computer name of another computer in the network into a machine address. When utilising the present invention that computer will be the data processing system Of the preferred embodiment.

Hence when a program running on a client computer 20 (for clarity, only one client computer is illustrated) wishes to obtain access to a server computer (40, 50, 60) in the cluster it will communicate with the data processing system 10 in order to obtain a full Internet machine address for the desired server (Internet addressing is part of the TCP/IP protocol). With the prior art technique the client computer would specify a server computer name in this communication that was specific to one particular server computer in the cluster. The input means 30 of the data processing system 10 would receive this server computer name and pass it to the conversion means 70.

In a storage device 80 of the data processing system a list is maintained which identifies server computer names with particular Internet addresses. When the conversion means is initiated the copier 90 copies this list from the storage device 80 into a piece of local memory 100 accessible by the conversion means 70. Hence the conversion means will access the list in memory 100 to find the Internet address of the computer associated with the server computer name passed to it by the input means 30. This Internet address will then be provided by the conversion means to the output means 110 for transmission back to the client computer 20.

Once the client computer has the Internet address it can then make direct contact with the server computer residing at the Internet address provided; in FIG. 1 this is server computer 2. Since the TCP/IP protocol is used any of the access methods that use this protocol can be used to access the server computer.

When using the data processing system of the preferred embodiment the program running on the client computer 20 will not use the server computer name that it previously used. Instead a generic server computer name will be used. This generic server name will either have been placed in the program's configuration file, or alternatively the user of the program will specify the generic name when running the program.

Within the data processing system, decision logic 120 is provided which periodically studies the server computers in the cluster having regard to some predetermined test criteria, hereafter called the metric string. In the preferred embodiment the metric string is a list of questions which when answered by the various server computers will enable the decision logic to decide which server computer is most suitable for a client connection (the most suitable perhaps being the least heavily leaded server computer). The metric string can be altered as the system administrator deems appropriate, depending on what criteria the administrator wishes to be used to select a server computer.

In the preferred embodiment the decision logic actually sets up a number of child processes, each one being responsible for sending the metric string to a particular server computer and receiving the response from the server computer.

Once the responses have been received the decision logic will collate the responses, decide which server computer is most suitable, and then request the writing means 160 to pass the Internet address of that server computer to the storage device for association with the generic server computer name. If however the most suitable server computer is the same server computer as that identified in the last iteration of the process then there is no need to update the storage device and the writing means will not be activated.

Once any necessary update to the storage device 80 has been made the messaging means 170 will notify the copier 90 so that the copier updates the local memory 100 with the new list as stored in the storage device 80.

Hence when the client computer requests a machine address for the generic server computer name the conversion means 70 accesses the list in memory 100 and identifies a machine address just as it would if any other server computer name had been given. However in this instance the machine address actually relates to the server computer in the cluster which has been identified by the decision logic as the most suitable (eg. least heavily loaded). When this machine address is passed back to the client computer 20 via the output means 110, the client computer will proceed to automatically access the server which is most suitable.

By this approach it will be seen that a dynamic load levelling facility is provided which is completely transparent to the client program. As far as the program is concerned it is requesting a machine address as normal and is using one of the normal TCP/IP access methods to gain access to the server computer allocated to it.

In many of todays computing environments (eg Unix, AIX (Unix is a Trade Mark of Unix Systems Laboratories Inc)) an application is provided to perform the standard name resolution service (ie receipt of a computer name and conversion of that computer name into a full Internet address). This application is commonly known as a "nameserver" application, and is installed on one or more computers in the logical network. Every other computer in the network is told to communicate with a specified one of these 'nameserver' computers when it wishes to determine an Internet address for any other computer in the network. Hence a nameserver computer provides a resolution service to client computers by receiving from them a convenient name (called a Uniform Resource Locator or URL) given to a particular computer (eg. abc.def.ghi.com), and converting it into a full Internet address (eg. 29.1.19.66). This Internet address is then used by the routing subsystem (TCP/IP) to allow a client user or application access to the physical computer (eg "abc" in this example).

In the above example of a computer name, "abc" is the physical machine, "def" is typically the site location, "ghi" the organisation, and "com" one of the Internet classes (three such classes are (com)mercial, (edu)cation, (mil)itary). Domains and sub-domains can also be added as part of this computer name. Basically the name takes a hierarchical form, with the finest resolution at the beginning and the coarsest resolution at the end; this type of naming structure will of course be well known to those skilled in the art.

All TCP/IP-based applications, including remote-login, remote-shell, telnet, ftp, and also client-server applications (such as database applications), are aware of the nameserver facility, and will automatically go to the designated nameserver computer to ask for resolution of a computer name into an Internet address before attempting to make a connection to another computer in the network.

If we consider FIG. 1 again, the standard nameserver facility will include the following elements: the input means 30, the conversion means 70 with associated memory 100, the output means 110, the list stored in the storage device 80, and the copier 90.

The nameserver application is a "daemon" (background) process which runs on the data processing system; this data processing system may (but need not) be one of the server computers forming part of the cluster over which users are to be distributed. In Unix-type operating systems (eg. AIX by IBM Corporation, Ultrix by Digital Equipment Corporation, OSF/1 by the Open Software Foundation, and HP-UX by Hewlett Packard, etc) this daemon process is called "named" (name-daemon), and when it is initialised, it reads a special database file (named.data) stored on the storage device 80 to obtain details of the computer names about which it is expected to know (over which it has "authority"), and the corresponding Internet addresses ("dotted decimal", e.g. 29.1.19.66) for each computer name. Whilst the name daemon is operating, it can be forced to re-read the information from the named.data database file by the sending of an inter-process signal to the name daemon process telling it to update its internal tables 100 from the database file (named.data).

In the preferred embodiment of the present invention we provide a further facility which runs on the same computer as the nameserver application ("named"), and interfaces with it. A 'generic' computer name is introduced into the database file (named.data), which refers not to one specific computer, but to any one of a number of computers offering equivalent functionality. For example, the generic name might be "server.cluster.def.ghi.com"; a client program requesting a connection to 'server cluster' is requesting connection to any one of the computers in the server cluster.

The further facility provided by the preferred embodiment will be referred to hereafter as the "User Load Leveller" (ULL) application. This application is responsible for deciding which server computer in the cluster is currently the least heavily loaded, according to some appropriate metric, and for conveying this information to the nameserver application. Then subsequent requests for resolution of the generic server computer name to an Internet address result in the nameserver application sending back to the client computer the Internet address of the server computer which has been deemed to be the most appropriate server computer for connection at that point in time.

The ULL application consists of the following elements from FIG. 1: the decision logic 120 with child processes 130, 140, 150; the writing means 160; and the messaging means 170. As described earlier with reference to FIG. 1 the ULL application periodically (at a frequency which can varied (eg. tuned by a system administrator or dynamically adjusted)) polls the server computers in the cluster to determine how "busy" in some sense they are. The metric used may vary, depending on the type of work which is being handled by the cluster, but may for example include the number of login sessions, number of application instances running, number of idle cpu cycles since the last poll, etc. The metric can be altered to ensure that it is appropriate to a specific situation.

Based on the results of this polling, and taking into account the situation where a server computer in the cluster is too busy to respond to the status request within a certain number of seconds, the ULL application decides which machine is currently the least heavily loaded. The ULL application then modifies the database file (named.data) to associate the generic cluster machine name with the Internet address of this least heavily loaded machine, and sends the special inter-process signal via the messaging means 170 which tells the nameserver application to re-read its database file. The nameserver application will then, in response to a name resolution request from a client program, resolve the generic server computer name into the Internet address of the most appropriate server computer in the cluster for the client program to connect to.

Figure 2:
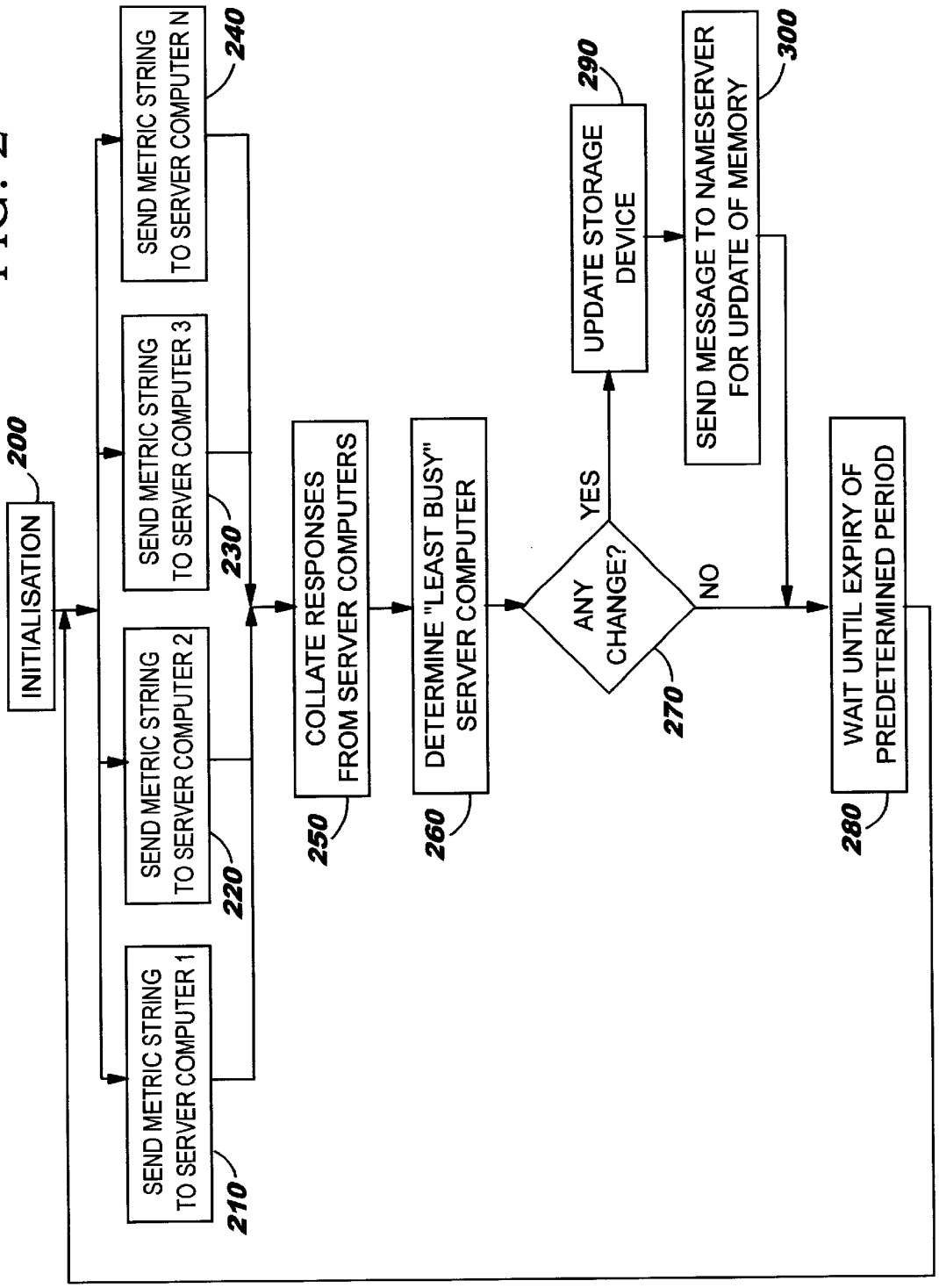
FIG. 2 is a flow diagram illustrating how the decision logic in the data processing system of the preferred embodiment operates.

The process carried out by the decision logic 120 of the preferred embodiment will now be described in more detail with reference to FIG. 2. At step 200 the ULL application is initialised. A number of steps are carried out at initialisation. For example the application: checks for multiple copies of the ULL application in memory; cleans up from a previous run of the application (by freeing up system resources such as memory, locks and semaphores still held in the name of the previous instance of the ULL application); and locates the nameserver application (named) and its data file (named.data). The ULL application then parses its configuration file to read information defined by the system administrator, such as the metric strings, poll periods, identities of server computers in the cluster, etc. Further the ULL application generates a number of "child" processes—one per server computer—which are each responsible for polling the activity of one designated server.

Once the initialisation has been completed the process enters a main loop which executes until the ULL application is terminated. At steps 210, 220, 230 and 240 the child processes send a metric string (as defined by the system administrator) to each server computer in the cluster, await responses from those computers, and then wait for a trigger signal from the main ULL application.

Once the trigger signal has been sent by the main application the responses are sent by the child processes to the main application. The main application then collates the activity results received from the child processes (step 250), and based on predetermined test criteria identifies the most appropriate server computer (the "least busy" server computer) at step 260. At step 270 it is determined whether the server computer identified at step 260 differs from the current nominated server computer. If it does then the process advances to step 290, at which point the nameserver's data file (named.data) is modified. Further at step 300 a notification signal is sent to the nameserver application (named) to tell it to update its internal information from the data file.

The process then proceeds to step 280. If at step 270 it is determined that the server computer identified at step 260 is the same as the current nominated server computer then the process moves straight to step 280 without steps 290 and 300 being carried out. Writing to and reading from the data file are time consuming activities and so steps 290 and 300 should only be performed when necessary (ie when the "least busy" server computer changes).

At step 280 the process waits until the end of the "poll period". This period is the predetermined interval (as defined by the system administrator) between successive studies of the server computers by the ULL application. Once the poll period has expired the process loops back to steps 210–240 and the main loop is repeated.

Figure 3:
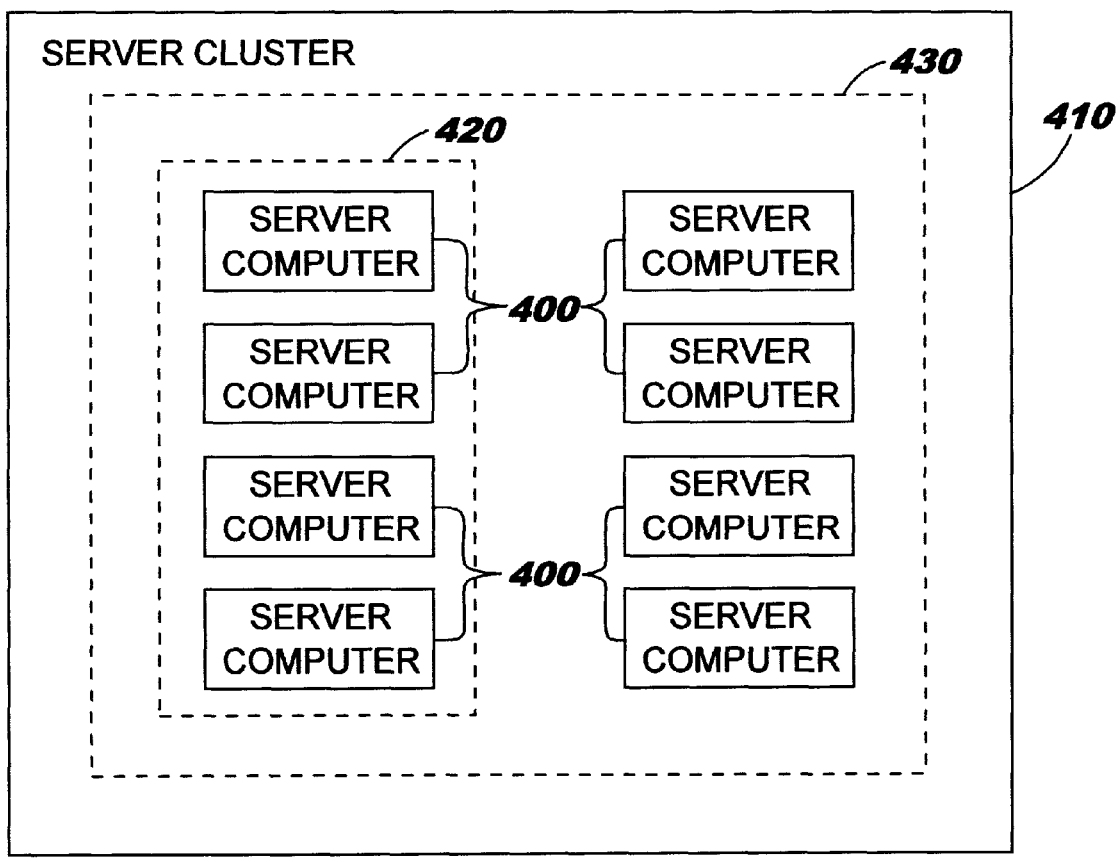
FIG. 3 illustrates a particular embodiment where two generic computer names are used.

Having discussed the preferred embodiment a few possible alterations will now be discussed. Firstly more than one generic server computer name can be added to the list in storage device 80 (the named.data file). Each generic name could be associated with a particular group of server computers, these groups being either completely separate or having a few server computers common to a plurality of the groups. Indeed one group may be a subset of another group. As an example consider FIG. 3. A server cluster 410 comprises eight server computers 400. All eight server computers have access to a main body of data, but only four of them have access to some further (possibly more confidential) data.

In this situation two generic names could be generated, eg. "general.cluster" and "specific.cluster". Any one of the eight computers (ehclosed by ring 430) can be associated with the former generic name, but only the four enclosed by ring 420 can be associated with the latter generic name, since only those four have access to the further (confidential) data.

The system administrator can then set up the metric string to be used when studying all eight server computers, or when studying only the four in ring 420; the metric string could be the same in both instances but need not be. If a client application needs access to the confidential information then it would request access to "specific.cluster", but if an application only needed access to the general information then it would request access to "general.cluster".

By this approach an application which only needs access to the general information will always be connected to the least busy server computer, whilst an application which needs access to the further (confidential) information will be given the machine address of the least busy server computer that can actually provide the necessary service; this may or may not be the least busy server computer in the network.

In preferred embodiments a further feature is provided to enable the decision logic to temporarily implement a "round-robin" metric instead of the above described 'studying' process. The round-robin principle will be familiar to those skilled in the art; basically when a client application requests access to a server computer it is assigned a particular server computer, and when the next request is received then that application is assigned the next server computer in the cluster, and so on. In this way the server computers are rotated so that each successive server access is made on a different server computer to the previous server access. Alternatively the server computers can be rotated at fixed time intervals rather than after each access request.

Although the round-robin technique does not have regard to the loading on any of the server computers, and so there is no determination of the least busy server computer, there are certain situations (eg. where there are lots of client applications which only take a short amount of database connection time) where a round-robin approach is acceptable. To implement the round robin approach the decision logic 120 would ask the writing means 160 to update the storage device 80 after each access request has been handled (or at fixed time intervals if the alternative approach is used), so that the generic name is always associated with successive server computers in the cluster in turn.

From the above description it will be clear that the system of the preferred embodiment has a number of advantages. Firstly the technique dynamically allocates new client users and applications to the server computer which is least heavily loaded at the time they make the connection, thus ensuring an even distribution of users and applications across all of the available server computers. The client computer only briefly contacts the data processing system of the preferred embodiment to resolve the generic computer name into a machine address. Completely standard access methods (eg. as provided by TCP/IP) are then used to make the connection, thus avoiding any proprietary protocols or any need to modify access methods or applications, and so providing fully transparent user load levelling.

Secondly the technique of the preferred embodiment does not involve any modification to the nameserver code—the User Load Leveller application interfaces with the standard code (eg. "named" as shipped with the unix/AIX operating system). It would be possible to provide similar functionality to that described here by producing a modified version of the nameserver code. However, avoiding this brings major advantages from both marketing and maintenance points of view.

Further the technique can be operated without requiring any modification to the server computers. They are accessed in a standard way after the generic server computer name has been used to provide the client computer with a machine address.

Another advantage is that the key parameters, such as the time interval between polls of the server computers in the cluster and the metric used to determine which server computer is least heavily loaded, can be altered and tuned by a local system administrator, allowing the system to be optimised for a particular situation.

The above described ULL application could be supplied as a separate tool to enhance the useability of parallel and distributed systems, or could be shipped with the nameserver application.

What is claimed is:

1. A name server computer for facilitating a connection of a program on a client computer to a server computer, the name server computer, the client computer, and the server computer residing in a network, the name server computer comprising:

input means for receiving a request from the client computer for a network address of a server computer identified by a Uniform Resource Locator (URL) name sent with the request, such network address enabling a connection to be made from the client computer to that server computer via the network;

a storage device for storing a list identifying URL names with network addresses of server computers, said list including at least one URL name which is a generic URL name corresponding to a plurality of server computers residing in said network;

conversion means for using the list to convert a URL name received by the input means into a network address of a server computer;

output means for sending the network address from the conversion means to the client computer;

load levelling decision logic for studying the plurality of server computers corresponding to said generic URL name at predetermined intervals having regard to predetermined test criteria relating to the relative load conditions of said plurality of server computers, in order to select one of the plurality of server computers;

means for determining if the selected one of the plurality of server computers is the same server computer as that last selected, writing means responsive to the determining means for updating the list by associating the network address for the server computer selected by the decision logic with said generic URL name only if the selected one of the plurality of server computers is different from the sever computer last selected;

a copier to copy the list from the storage device to a piece of memory accessible by the conversion means, and a message passing means responsive to the updating of the list by the writing means, for sending a message to the copier requesting the copier to copy the updated list into the piece of memory, whereby when a client computer specifies the generic URL name, it receives the network address of the server computer identified by the decision logic.

2. A name server computer as claimed in claim 1 wherein the predetermined test criteria are such that the decision logic identifies the server computer having the least number of client programs logged on to it.

3. A name server computer as claimed in claim 1 wherein the predetermined intervals are variable.

4. A name server computer as claimed in claim 1 wherein the predetermined test criteria are set by a user of the system.

5. A name server computer as claimed in claim 1, wherein the user can limit the number of server computers which the decision logic studies.

6. The name server computer as claimed in claim 1, wherein a plurality of generic URL names are included in the list, the decision logic employing different sets of predetermined test criteria for each generic URL name for analysing the relative load conditions of the respective plurality of server computers.

7. A name server computer as claimed in claim 6, wherein one or more of the server computers are associated with a plurality of the generic names.

8. A method of operating a name server computer to facilitate a connection of a program on a client computer to a server, the name server computer, the client computer, and the server computer residing in a network, the method comprising the steps of:

(a) receiving a request from the client computer for a network address of a server computer identified by a Uniform Resource Locator (URL) name sent with the request, such network address enabling a connection to be made from the client computer to that server computer via the network;

(b) storing a list identifying URL names with network addresses of server computers in a storage device, said list including at least one URL name which is a generic URL name corresponding to a plurality of server computers residing in said network;

(c) converting, with reference to the list, the URL name received at step (a) into the network address of a server computer; and (d) sending the network address identified at step (c) to the client computer;

wherein the following steps are also performed to facilitate the performance of the above steps:

(e) employing load levelling decision logic to study the plurality of server computers corresponding to said generic URL name at predetermined intervals having regard to predetermined test criteria relating to the relative load conditions of said plurality of server computers, in order to select one of the plurality of server computers; and (f) updating the list by associating the network address for the server computer selected by the decision logic with said generic URL name only if the selected one of the plurality of server computers at the present predetermined interval differs from the last selected one of the server computers;

copying the list from the storage device to a piece of memory accessible to the converting step only if the list is updated at step f);

whereby when a client computer specifies the generic URL name at step (a), it receives at step (d) the network address of the server computer identified by the decision logic at step (e) upon performance of the converting step (c).

9. A method as claimed in claim 8 wherein the predetermined intervals are set by a user of the system.

10. A method as claimed in claim 8 wherein the predetermined test criteria are set by a user of the system.

11. A method as claimed in claim 8 wherein the user can limit the number of server computers which the decision logic studies.

12. The method as claimed in claim 8, wherein a plurality of generic URL names are included in the list, the decision logic employing different sets of predetermined test criteria for each generic URL name for analysing the relative load conditions of the respective plurality of server computers.

13. A method as claimed in claim 12, wherein one or more of the server computers are associated with a plurality of the generic names.

* * * * *